UNITED STATES PATENT OFFICE.

WILLIAM PITT CLOTWORTHY, OF BALTIMORE, MARYLAND.

PRESERVING EDIBLE ANIMAL FATS.

SPECIFICATION forming part of Letters Patent No. 284,184, dated September 4, 1883.

Application filed July 17, 1883. (No specimens.)

*To all whom it may concern:*

Be it known that I, WILLIAM PITT CLOTWORTHY, a citizen of the United States, residing in the city of Baltimore, in the State of Maryland, have invented a certain new and useful Improvement in Preserving the Sweetness of Edible Animal Fats; and I do hereby declare that the following is a full, clear, and exact description of the invention.

It is a well-established fact that the deterioration of butter or of lard begins at the surface or place of "air contact." The surface molecules, having deteriorated or become rancid by reason of such contact, the rancidity is communicated to the remainder until the whole mass is affected and damaged, the transmission of the damaging agency being very rapid. Not only are certain valuable properties in edible animal fats lost thereby, but the article will have become more difficult of being digested.

The object of my invention is to prevent the deterioration of such articles by the addition of a small proportion of paraffine. This article is non-oxidizable, and is without taste or odor. It acts mechanically by perfectly excluding the air from the surface molecules. While paraffine is without nutritive properties, it performs the important office of preserving the good qualities of edible animal fats, which qualities are frequently destroyed by the action of the air, as above stated. In the process of digestion the paraffine is separated from the other ingredients, and passes off as inert matter, as does beeswax when swallowed with honey. This needs no demonstration to those who are aware of the truth that tons of paraffine are used by children every year, in the form of chewing-gum.

I have ascertained that the use of a small proportion of paraffine in butter will render the use of salt unnecessary.

My process with butter is as follows: I take an ounce of fresh unsalted butter and incorporate with it one ounce of paraffine, and thus form a jelly, and then I thoroughly mix this amount of jelly in one pound of butter.

With lard, I combine the paraffine in manner as follows: When the lard is ready to be drawn off from the rendering-kettles, and while still hot, I add one ounce of paraffine to each pound of lard, and stir the mass well.

Having fully described my invention, what I claim, and desire to secure by Letters Patent, is—

1. In preserving the sweetness of edible animal fats, the process of incorporating paraffine with said substances, in the proportions of one ounce of paraffine to about seventeen ounces of butter, or one ounce of paraffine to a pound of lard, all substantially as hereinbefore described.

2. The herein-described composition of matter to be used for preserving the sweetness of edible animal fats, consisting of one of said articles and paraffine, in the proportions specified.

WILLIAM PITT CLOTWORTHY.

Witnesses:
LOUIS HORPEL,
LEWIS B. BROWNE.